Figure 1:
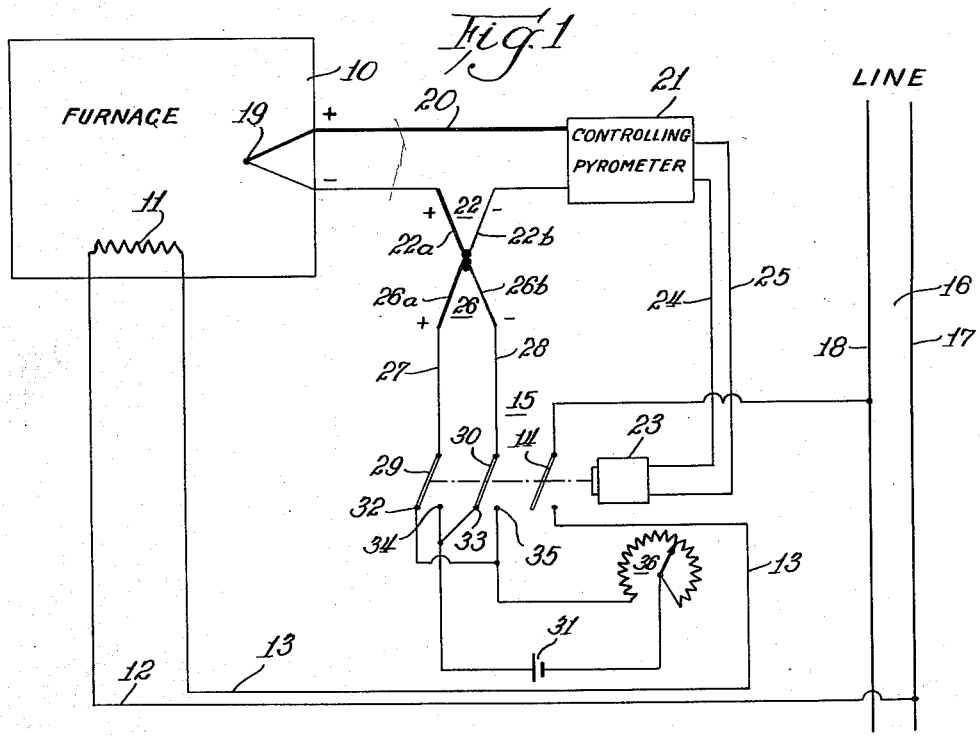

Oct. 16, 1956  H. L. SNAVELY  2,766,937
STABILIZED HEATING SYSTEM
Filed Oct. 30, 1952

INVENTOR,
Harold L. Snavely
BY
Atty

United States Patent Office

2,766,937
Patented Oct. 16, 1956

2,766,937

STABILIZED HEATING SYSTEM

Harold L. Snavely, Oak Lawn, Ill.

Application October 30, 1952, Serial No. 317,768

10 Claims. (Cl. 236—15)

This invention relates generally to stabilized heating systems and more particularly to such systems incorporating apparatus for anticipating changes in heat requirements, in accordance with the rate of heating or cooling, to provide automatic temperature control.

Numerous industrial heating processes require precise temperature regulation and control to provide satisfactory and uniform results. To this end, it has long been common practice to provide a working thermocouple within the furnace or oven for the purpose of generating a control potential which varies in accordance with temperature variations within the furnace, and to apply this control potential to a controlling pyrometer coupled to the furnace energy supply source in such a manner as to control the working temperature within predetermined limits. However, simple systems of this type are characterized by a time lag between the operation of the control pyrometer and the resulting temperature variation within the furnace, causing a hunting or overshooting condition which may not be tolerated in certain precise industrial processes. For example, when such a system is preset to maintain the temperature within the furnace at 1500 degrees Fahrenheit, the actual working temperature may vary cyclically between 1450 degrees and 1550 degrees Fahrenheit.

Considerable effort has been directed to the problem of reducing the range of temperature fluctuation in stabilized heating systems of this type, and several systems for anticipating changes in heat requirements have been devised. In general, anticipatory systems operate on the principle of increasing the rate of change of the control potential applied to the controlling pyrometer, thus compensating for the time lag caused by the heat capacity of the furnace and its heating element. In this manner, temperature fluctuations within the furnace have been reduced in amplitude by as much as 90 percent.

One type of anticipatory heat stabilizing system which has achieved a large measure of success comprises a pair of auxiliary thermocouples connected in series opposition with each other and in series with the working thermocouple. By constructing the auxiliary thermocouples of different thermal capacities and disposing them in heat transfer relationship with a resistance heating element intermittently energized under the control of the pyrometer, the rate of change of the control voltage applied to the pyrometer may be increased, and greater precision of temperature control may be achieved. Substantially the same result may be achieved by associating each of the auxiliary thermocouples with separate resistance heating elements which are alternately energized and de-energized under the control of the pyrometer as it establishes and interrupts the connection from the energy source to the furnace heating element. While anticipatory systems of this type have achieved the desired purpose of reducing the range of temperature fluctuation within the furnace, an appreciable residual fluctuation is still encountered. Moreover, the use of resistance heating elements is an undesirable complexity, from the point of view of initial cost, added power consumption, and susceptibility to failure.

It is a primary object of the present invention to provide a new and improved heat stabilizing system for use in the maintenance and control of substantially constant temperatures in industrial heating processes.

It is a more specific object of the invention to provide a novel heat stabilizing system which effectively anticipates changes in heat requirements to reduce the range of temperature fluctuation, yet which is simple and economical to construct and to operate.

It is a further object of the invention to provide such a new and improved heat stabilizing system which provides more precise automatic temperature control than previously known systems of comparable complexity.

Still another object of the invention is to provide a new and improved anticipatory heat stabilizing system which employs no resistance heating elements or similar components susceptible to failure in operation.

These and other objects of the invention are accomplished by interposing a stabilizing thermocouple in series between the working thermocouple and the control pyrometer. A control thermocouple is disposed in heat transfer relationship with the stabilizing thermocouple, preferably in direct thermal contact to permit the direct transfer of heat by conduction from the control couple to the stabilizing couple. Means are provided for inducing a unidirectional (D. C.) electric current flow through the control thermocouple, and further means are provided for reversing the direction of the unidirectional electric current flow. Preferably, the current-reversing means is controlled by the pyrometer in synchronism with the switching of energy to the furnace heating element.

Figure 2:
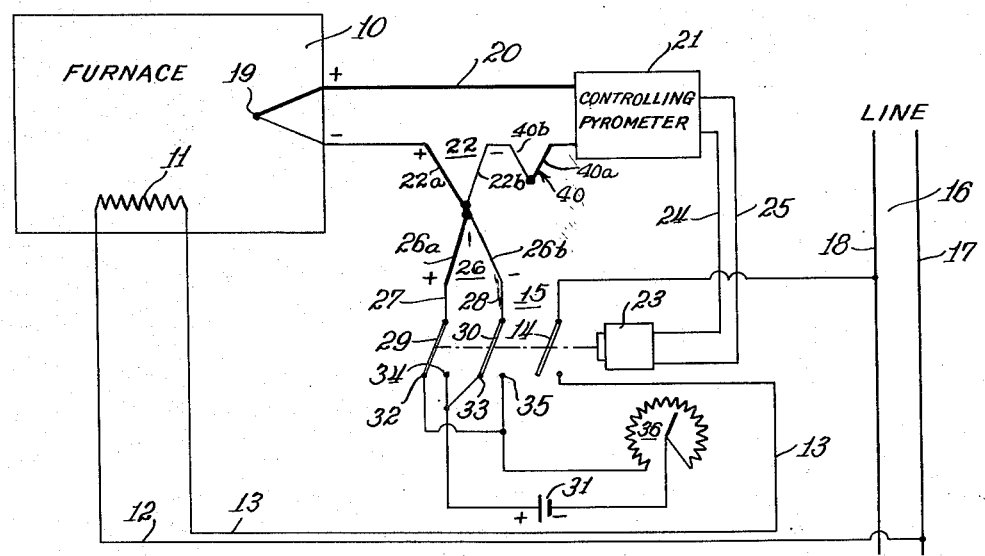

The features of the present invention which are believed to be novel are set forth with particularity in the appended claims. The invention, together with further objects and advantages thereof, may best be understood, however, by reference to the following description in conjunction with the accompanying drawing, in the several figures of which like reference numerals indicate like elements, and in which:

Fig. 1 is a schematic diagram of a stabilized heating system embodying the present invention, and Fig. 2 is a schematic diagram of a modification of the system of Fig. 1, incorporating an additional feature of the invention.

In the system of Fig. 1, a conventional furnace 10 is provided with an electrical resistance heating element 11, which in turn is connected through a pair of supply leads 12 and 13 and through a normally open contact arm 14 of a relay 15 to a source of alternating current such as a power supply main indicated at 16 by a pair of line conductors 17 and 18. It is also possible to employ the system of the present invention to control or to stabilize the operation of other types of furnaces such as those employing gas or oil burners, in which case the two conductors 12 and 13 are connected to an electric motor or relay (not shown) which controls the supply of fuel to the furnace 10.

A low-resistance working thermocouple 19 is installed within furnace 10 in such a position as to register the operating temperature within the furnace. Although numerous types of thermocouple may be employed, the system will be described as utilizing a thermocouple having a junction of iron and constantan. The iron, or positive-polarity, side of the working thermocouple 19 is connected by means of a conductor 20 to one input terminal of a control pyrometer 21, while the constantan, or negative-polarity, side of the working thermocouple 19 is connected through a stabilizing thermocouple 22 to the other input terminal of control pyrometer 21. Control pyrometer 21, which may be of conventional construction, in turn is coupled to the operating coil 23 of relay 15, as by means of conductors 24 and 25. Stabilizing thermocouple 22 may also comprise a junction of iron and constantan wires 22a and 22b, respectively.

Stabilizing thermocouple 22 constitutes an anticipatory element for increasing the rate of change of the control voltage applied to pyrometer 21 with respect to the EMF developed by working thermocouple 19, in order to stabilize the temperature of furnace 10 against temperature variations occasioned by the on-off actuation of the resistance heating element 11, in a manner to be described more fully hereinafter.

In accordance with the present invention, a further thermocouple 26, which is termed a control thermocouple to distinguish it from the working and stabilizing couples, is disposed in heat transfer relationship with stabilizing thermocouple 22. Control thermocouple may, for example, constitute a junction between an iron wire 26a and a constantan wire 26b, and the junctions of couples 22 and 26 may be in electrically independent circuits but in direct thermal contact. The two terminals of thermocouple 26 are connected by way of leads 27 and 28 through a reversing switch, which may conveniently assume the form of a pair of contact arms 29 and 30 associated with operating coil 23 of relay 15, to the opposite terminals of a suitable source of unidirectional (D. C.) electric current, here represented as battery 31. Specifically, the iron side 26a of control couple 26 may be connected by way of lead 27 to contact arm 29 of relay 15 while the constantan side 26b of couple 26 is connected by means of lead 28 to contact arm 30 of relay 15. Contact arms 29 and 30 of relay 15 are constructed and arranged to engage contact terminals 32 and 33 respectively when operating coil 23 of relay 15 is de-energized, and to engage contact terminals 34 and 35 respectively in response to energization of operating coil 23. Contact terminals 33 and 34 are connected together and to the positive terminal of battery 31, while contact terminals 32 and 35 are connected together and to the negative terminal of battery 31. A rheostat 36 may be included in series with battery 31 for a purpose to be described hereinafter.

In its general aspects, the operation of the heat stabilizing system of Fig. 1 is similar to that of previously known anticipatory systems, in that an auxiliary electromotive force is superimposed on that developed by the working thermocouple within the furnace to increase the rate of change of the control voltage applied to the control pyrometer. However, the system of the present invention differs from previously known systems in the mechanism by which the auxiliary voltage or electromotive force is generated.

More specifically, it is well known that when electric current is passed across the junction between two different metals in one direction, an evolution of heat takes place. On the other hand, if the direction of electric current flow is reversed, a heat absorption occurs. This effect, known as the Peltier effect, is an inversion of the Seebeck thermoelectric effect on which the operation of measuring thermocouples, such as working thermocouple 19 within furnace 10, is based. The present invention makes effective use of the Peltier effect to actuate the auxiliary or stabilizing thermocouple which provides the anticipatory control voltage for superposition on the electromotive force developed by the working thermocouple.

In accordance with the present invention, unidirectional electric current is caused to flow through control thermocouple 26 in one direction when operating coil 23 of relay 15 is de-energized and in the opposite direction when operating coil 23 is actuated by control pyrometer 21. Specifically, when the furnace is first turned on, control pyrometer 21 energizes operating coil 23 of relay 15 to close contact arm 14 and supply alternating current to resistance heating element 11, thus increasing the furnace temperature. During this time, contact arms 29 and 30 of relay 15 engage terminals 34 and 35 respectively, due to the energization of operating coil 23, so that a unidirectional electric current from battery 31 is caused to flow through control thermocouple 26 from the iron side 26a to constantan side 26b. This flow of unidirectional electric current causes the junction of thermocouple 26 to evolve heat, in accordance with the Peltier effect, and since stabilizing thermocouple 22 is disposed in heat transfer relation with control couple 26, an electromotive force having the indicated polarity is developed at the terminals of stabilizing thermocouple 22. This electromotive force is of aiding polarity with respect to that generated by working thermocouple 19 within the furnace 10. As a consequence, the control voltage applied to pyrometer 21 reaches the required magnitude for de-energizing operating coil 23 of relay 15 earlier than would be the case if the control voltage were generated wholly by working thermocouple 19. In other words, the superposition of the auxiliary control voltage generated by stabilizing thermocouple 22 has the effect of anticipating changes in heat requirements within furnace 10, so that operating coil 23 of relay 15 is de-energized to open contact arm 14 and interrupt the flow of energy to resistance heating element 11 at a time sufficiently earlier than would be the case in the absence of the anticipatory system to compensate for the lag in thermal capacity between the furnace heating element and the working thermocouple.

Upon de-energization of operating coil 23 of relay 15, contact arms 29 and 30 disengage contact terminals 34 and 35 and engage contact terminals 32 and 33 respectively. By virtue of the external circuit connections, this effectively reverses the direction of current flow through control couple 26, with the result that this couple now absorbs heat due to the Peltier effect. As a consequence, stabilizing thermocouple 22 is subjected to a cooling effect. At the same time, by virtue of the opening of contact arm 14, the supply of energy to resistance heating element 11 is interrupted, and furnace 10 enters a cooling cycle. As the furnace cools down, the voltage generated by working thermocouple 19 is reduced. Since stabilizing thermocouple 22 is subjected to a cooling effect, due to the absorption of heat by control couple 26, during the cooling portion of the operating cycle, the auxiliary voltage generated by couple 22 continues to change in the same direction as that generated by working thermocouple 19. As a consequence, the control voltage applied to pyrometer 21 falls below that required to trip operating coil 23 of relay 15 prior to the time at which the actual operating temperature of working thermocouple 19 would indicate a necessity for such a change. In this manner, the heat requirements of the furnace are effectively anticipated, with the result that the temperature variations within the furnace are materially damped out, and substantially constant temperature is achieved.

Rheostat 36 is included in the unidirectional electric current supply circuit for the purpose of regulating the amount of current flow through control couple 26, thus providing a convenient control over the magnitude of the anticipatory auxiliary voltage generated by stabilizing couple 22. In this manner, the rate of heating or cooling stabilizing thermocouple 22 may be adjusted in accordance with the requirements of a particular furnace or a particular charge within the furnace.

While the stabilizing thermocouple 22 has been illustrated and described as being interposed in series aiding polarity between working thermocouple 19 and control pyrometer 21, it is quite possible to achieve the desired result with a system in which the polarity of the stabilizing thermocouple is in opposition with that of the working thermocouple. In such a system, which has not been illustrated, the terminal connections of unidirectional electric current source 31 are merely reversed so that the stabilizing thermocouple is cooled during the heating portion of the furnace cycle and heated during the cooling portion of the furnace cycle.

It is preferred that stabilizing thermocouple 22 be disposed in direct thermal contact with control couple 26. However, it is also possible to achieve the desired results, although with some decrease in sensitivity, by relying on radiated heat from control couple 26 during one portion of the cycle, and radiant heat absorption during the other portion of the operating cycle. It may be desirable to enclose the stabilizing and control couples 22 and 26 within an evacuated vessel for the purpose of insulation from variations in ambient temperature and other external ambient conditions.

While the stabilizing system illustrated in Fig. 1 has been employed with a great deal of success, providing a reduction in the temperature fluctuation within furnace 10 of over 90 percent, a certain small proportion of the auxiliary control voltage developed by the stabilizing thermocouple 22 is bucked out by the resistance heating of the junction of control thermocouple 26, in proportion to the square of the current flowing through control couple 26. Although a reversal in the direction of unidirectional electric current flow through control couple 26 results in a change from heat absorption to heat evolution due to the Peltier effect, such reversal in the direction of current flow has no substantial effect upon the amount of heat attributable to the resistance of the junction. This resistance heating of control couple 26 results in an unbalance between the magnitudes of the anticipatory auxiliary control voltages developed by stabilizing couple 22 during the respective heating and cooling portions of the cycle. In accordance with another feature of the invention, the system of Fig. 1 may be modified as shown in Fig. 2 to eliminate the unbalance effect attributable to resistance heating of the control couple.

The system of Fig. 2 is essentially similar to that of Fig. 1, except that an additional thermocouple 40, termed a compensating thermocouple, is disposed in heat transfer relationship with respect to the junction between stabilizing couple 22 and control couple 26. More specifically, the constantan lead 22b of stabilizing couple 22 is connected to the constantan lead 40b of the compensating couple 40 rather than directly to control pyrometer 21. The iron lead 40a of compensating couple 40 is then connected to control pyrometer 21 to complete the anticipatory stabilizing system.

The effect of adding the compensating thermocouple 40 is to generate a bucking voltage in series with the anticipatory control electromotive force generated by stabilizing thermocouple 22, the magnitude of this bucking voltage being proportioned to correspond to the heat attributable to the resistance of the junction between leads 26a and 26b of control couple 26. In this manner, balanced or symmetrical operation of the anticipatory stabilizing system is achieved.

More particularly, the heat evolved by control couple 26 due to the passage of current through the resistance of the junction is transferred to stabilizing couple 24 and thus results in the generation of a steady component of electromotive force which is invariant with actuation of relay 15. However, compensating couple 40 also generates an electromotive force, in response to radiated heat from control couple 26, whose magnitude corresponds to the resistance heating of control couple 26. The stabilizing and compensating thermocouples are differentially connected in series with the working thermocouple, so that the control voltage applied to pyrometer 21 is free from any component corresponding to the resistance heating of control couple 26. However, the anticipatory voltage attributable to the Peltier effect is superimposed on the control voltage developed by working thermocouple 19 to accelerate the action of pyrometer 21 and thus damp out undesirable temperature variations within furnace 10, as explained in connection with the system of Fig. 1.

For purposes of convenience, each of the thermocouples employed in the stabilizing systems illustrated in Figs. 1 and 2 have been described as being of an iron-constantan construction. However, it is equally possible to employ thermocouples comprising other different metals joined at the indicated locations. For example, chromel-alumel or chromel-constantan couples may be employed in place of the iron-constantan thermocouples described. In general, the stabilizing couple 22 should be composed of the same two metals as the working thermocouple 19 within the furnace, although it is immaterial whether the control couple 26 is of the same or different construction. Where an additional thermocouple 40 is employed to balance out the effect of resistance heating of control couple 26, as in system of Fig. 2, this compensating couple should also be of the same general construction as working couple 19.

In each of the illustrated embodiments, the source of unidirectional electric current has been illustrated as a battery 31. In practice, it may be desirable to employ an alternating-current-energized copper oxide or selenium rectifier circuit connected to the same power supply mains 16 as resistance heating element 11 of furnace 10. The character of the unidirectional current source is entirely immaterial, although it should be emphasized that the Peltier effect on which the operability of the invention is predicated is only observed in useful magnitude when the energizing current is unidirectional or direct current. Consequently, it is not possible to achieve the stabilizing effect provided by the present invention by impressing an alternating current on control couple 26.

From the foregoing description, it is apparent that the present invention provides a new and improved anticipatory heat stabilizing system for substantially eliminating temperature fluctuations within a furnace. Consequently, the invention has wide applicability in the field of industrial heating processes where precise temperature control is essential or desirable.

While specific embodiments of the invention have been shown and described, it is apparent that numerous variations and modifications may be made, and it is contemplated in the appended claims to cover all such modifications as fall within the true spirit and scope of the invention.

What is claimed is:

1. A heat stabilizing system for use in conjunction with a furnace, a working thermocouple for generating a control voltage indicative of the temperature within said furnace, and a control pyrometer actuated by said control voltage for governing the supply of energy to said furnace, said heat stabilizing system comprising: a stabilizing thermocouple adapted to be interposed in series between said working thermocouple and said control pyrometer; a control thermocouple in heat transfer relationship with said stabilizing thermocouple; means for inducing unidirectional electric current flow through said control thermocouple; and means for reversing the direction of said unidirectional current flow, said reversing means effecting alternate evolution and absorption of heat in said control thermocouple.

2. A heat stabilizing system for use in conjunction with a furnace, a working thermocouple for generating a control voltage indicative of the temperature within said furnace, and a control pyrometer acutated by said control voltage for governing the supply of energy to said furnace, said heat stabilizing system comprising: a stabilizing thermocouple adapted to be interposed in series between said working thermocouple and said control pyrometer; a control thermocouple in heat transfer relationship with said stabilizing thermocouple; means for inducing unidirectional electric current flow through said control thermocouple; and means controlled by said pyrometer for reversing the direction of said unidirectional current flow whereby to effect alternate evolution and absorption of heat by said control thermocouple.

3. A heat stabilizing system for use in conjunction with a furnace, a working thermocouple for generating a control voltage indicative of the temperature within said furnace, and a control pyrometer actuated by said control voltage for governing the supply of energy to said furnace, said heat stabilizing system comprising: a stabilizing thermocouple adapted to be interposed in series between said working thermocouple and said control pyrometer; a control thermocouple in heat transfer relationship with said stabilizing thermocouple; a source of unidirectional electric current; and means responsive to said pyrometer including a reversing switch connected between said source of unidirectional electric current and said control thermocouple for inducing current flow in either direction through said control thermocouple.

4. A heat stabilizing system for use in conjunction with a furnace, a working thermocouple for generating a control voltage indicative of the temperature within said furnace, and a control pyrometer actuated by said control voltage for governing the supply of energy to said furnace, said heat stabilizing system comprising: a stabilizing thermocouple adapted to be interposed in series between said working thermocouple and said control pyrometer; a control thermocouple in heat transfer relationship with said stabilizing thermocouple; a source of unidirectional electric current; and means responsive to said pyrometer including a reversing switch controlled by said pyrometer and connected between said source of unidirectional electric current and said control thermocouple for inducing current flow through said control thermocouple in opposite directions to effect evolution and absorption of heat therein during heating and cooling cycles respectively.

5. A heat stabilizing system for use in conjunction with a furnace, a working thermocouple for generating a control voltage indicative of the temperature within said furnace, and a control pyrometer actuated by said control voltage for governing the supply of energy to said furnace, said heat stabilizing system comprising: a stabilizing thermocouple adapted to be interposed in series between said working thermocouple and said control pyrometer; a control thermocouple in heat transfer relationship with said stabilizing thermocouple; means for inducing unidirectional electric current flow through said control thermocouple; means responsive to said pyrometer for reversing the direction of said unidirectional current flow; and a compensating thermocouple connected in series opposition with said stabilizing thermocouple and spaced from said control thermocouple for balancing out any voltage components attributable to resistance heating of said control thermocouple by said electric current.

6. A heat stabilizing system for use in conjunction with a furnace, a working thermocouple for generating a control voltage indicative of the temperature within said furnace, and a control pyrometer actuated by said control voltage for governing the supply of energy to said furnace, said heat stabilizing system comprising: a stabilizing thermocouple adapted to be interposed in series between said working thermocouple and said control pyrometer; a control thermocouple in direct thermal contact with said stabilizing thermocouple; means for inducing unidirectional electric current flow through said control thermocouple; and means for reversing the direction of said unidirectional current flow in response to the voltage applied to said pyrometer.

7. A heat stabilizing system for use in conjunction with a furnace, a working thermocouple for generating a control voltage indicative of the temperature within said furnace, and a control pyrometer actuated by said control voltage for governing the supply of energy to said furnace, said heat stabilizing system comprising: a stabilizing thermocouple adapted to be interposed in series between said working thermocouple and said control pyrometer; a control thermocouple in heat transfer relationship with said stabilizing thermocouple; a source of unidirectional electric current; a rheostat connected in series with said current source; and means including a reversing switch connected between said source of unidirectional electric current and said control thermocouple for inducing current flow in either direction through said control thermocouple for alternate heat evolution and absorption therein.

8. A stabilized heating system comprising: a furnace; a working thermocouple for generating a control potential which varies in accordance with temperature variations within said furnace; a control pyrometer responsive to an applied control voltage for governing the supply of energy to said furnace a stabilizing thermocouple; means connecting said working thermocouple and said stabilizing thermocouple in series and to said control pyrometer; a control thermocouple in heat transfer relationship with said stabilizing thermocouple; means for inducing unidirectional electric current flow through said control thermocouple; and means controlled by said pyrometer for reversing the direction of said unidirectional current flow whereby heat is alternately applied to and absorbed from said stabilizing thermocouple.

9. A stabilized heating system comprising: a furnace; a working thermocouple for generating a control potential which varies in accordance with temperature variations within said furnace; a control pyrometer responsive to an applied control voltage for governing the supply of energy to said furnace; a stabilizing thermocouple; means connecting said working thermocouple and said stabilizing thermocouple in series and to said control pyrometer; a control thermocouple for alternately absorbing and evolving heat in direct thermal contact with said stabilizing thermocouple; means for inducing unidirectional electric current flow through said control thermocouple; means controlled by said pyrometer for reversing the direction of said unidirectional current flow; and a compensating thermocouple connected in series opposition with said stabilizing thermocouple and subjected to radiated heat from said control thermocouple for nullifying the effect of resistance heating of said control thermocouple by said electric current.

10. A heat stabilizing system for use in conjunction with a furnace, a working thermocouple for generating a control voltage indicative of the temperature within said furnace, and a control pyrometer actuated by said control voltage, said heat stabilizing system comprising: a stabilizing thermocouple adapted to be interposed in series between said working thermocouple and said control pyrometer; a control thermocouple in direct thermal contact with said stabilizing thermocouple; means for inducing unidirectional current flow through said control thermocouple, and means for reversing the direction of said unidirectional current flow in response to relatively high and relatively low voltages applied by said working thermocouple to said pyrometer whereby heat is alternately applied to said stabilizing thermocouple and absorbed therefrom by said control thermocouple.

References Cited in the file of this patent

UNITED STATES PATENTS

| | | |
|---|---|---|
| 484,182 | Dewey | Oct. 11, 1892 |
| 2,148,491 | Moore | Feb. 28, 1939 |
| 2,376,488 | Jones | May 22, 1945 |
| 2,544,031 | Kyle | Mar. 6, 1951 |

OTHER REFERENCES

White, W. C.: "Some Experiments with the Peltier Effect," Electrical Engineering Magazine, volume 70, Number 7, July 1951, pp. 589–591.